(12) United States Patent
Romey et al.

(10) Patent No.: US 11,647,248 B2
(45) Date of Patent: May 9, 2023

(54) SYNCHRONIZED PLAYBACK WITHIN A CLIENT INTERFACE UTILISING WEB TECHNOLOGIES

(71) Applicant: Arcus Holding A/S, Brøndby (DK)

(72) Inventors: Thiemo Romey, Irvine, CA (US); Ari-Pekka Viitanen, Irvine, CA (US); Benjamin Player Rowe, Irvine, CA (US); Seungjin Kim, Lake Forest, CA (US)

(73) Assignee: ARCUS HOLDING A/S, Brøndby (DK)

( * ) Notice: Subject to any disclaimer, the term of this patent is extended or adjusted under 35 U.S.C. 154(b) by 0 days.

(21) Appl. No.: 17/516,377

(22) Filed: Nov. 1, 2021

(65) Prior Publication Data
US 2022/0141523 A1     May 5, 2022

Related U.S. Application Data

(60) Provisional application No. 63/108,823, filed on Nov. 2, 2020.

(51) Int. Cl.
| | |
|---|---|
| *H04N 21/43* | (2011.01) |
| *H04N 7/18* | (2006.01) |
| *H04N 21/472* | (2011.01) |
| *H04N 21/218* | (2011.01) |
| *H04N 21/84* | (2011.01) |

(52) U.S. Cl.
CPC ....... *H04N 21/43072* (2020.08); *H04N 7/181* (2013.01); *H04N 21/21805* (2013.01); *H04N 21/4305* (2013.01); *H04N 21/47217* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 9,894,126 B1* | 2/2018 | Block | H04N 21/4384 |
| 2006/0181612 A1* | 8/2006 | Lee | H04N 5/23206 348/E7.086 |
| 2010/0257396 A1* | 10/2010 | Batson | G06F 1/12 713/400 |
| 2012/0081567 A1* | 4/2012 | Cote | H04N 21/4223 348/222.1 |

(Continued)

*Primary Examiner* — James R Marandi
(74) *Attorney, Agent, or Firm* — Canon U.S.A., Inc. IP Division

(57) ABSTRACT

A method for initiating synchronized playback within a user interface by requesting a plurality of media data and processing the plurality of data so that the plurality of data is compatible with the user interface. A portion of the data from the plurality of data are stored in an overflow buffer while a source buffer processes the plurality of data. The method may continue by generating a metadata object to facilitate sync playback on the user interface by determining what data is in the source buffer of the user interface that needs to be removed and searching for data using a first time format that is not natively supported by the user interface and converting the first time format into a second time format that is natively supported by the user interface. The method also includes synchronizing between videos using a sync playback controller from the generated metadata object, wherein each video is represented as a sequence in the source buffer of the user interface.

15 Claims, 11 Drawing Sheets

(56) References Cited

U.S. PATENT DOCUMENTS

| | | | |
|---|---|---|---|
| 2014/0050455 A1* | 2/2014 | Ni .......................... | H04N 7/181 |
| | | | 386/E5.028 |
| 2016/0134864 A1* | 5/2016 | Regev ..................... | H04L 43/12 |
| | | | 348/192 |
| 2016/0248526 A1* | 8/2016 | Wang ................... | H04N 21/835 |
| 2020/0388304 A1* | 12/2020 | Yin ...................... | H04N 21/845 |
| 2022/0141523 A1* | 5/2022 | Romey .................. | H04N 7/181 |
| | | | 725/86 |

* cited by examiner

| Data | Length | Time |
|---|---|---|
| × Headers \| Messages \| Initiator Timing | | |
| ⊘ All ▾ Enter regex, for example: (web)?socket | | |
| ⇑ {"from":16274255250000,"to":16274255290000} —74 | 41 | 15:39:47.654 |
| ⇒ Binary Message ⎱ | 349 kB | 15:39:49.257 |
| ⇒ Binary Message ⎟ | 307 kB | 15:39:49.546 |
| ⇒ Binary Message ⎬—75 | 298 kB | 15:39:50.007 |
| ⇒ Binary Message ⎟ | 312 kB | 15:39:50.305 |
| ⇒ Binary Message ⎠ | 341 kB | 15:39:50.482 |
| ⇒ Binary Message —76 | 5 B | 15:39:50.648 |
| ⇑ {"from":16274255298622,"to":16274255338622} —79 | 41 | 15:39:54.888 |
| ⇒ Binary Message ⎱ | 370 kB | 15:39:55.237 |
| ⇒ Binary Message ⎬—80 | 408 kB | 15:39:55.622 |
| ⇒ Binary Message ⎟ | 588 kB | 15:39:55.872 |
| ⇒ Binary Message ⎠ | 463 kB | 15:39:56.277 |
| ⇒ Binary Message —81 | 5 B | 15:39:56.650 |
| ⇑ {"from":16274255340027,"to":16274255380027} —82 | 41 | 15:39:57.166 |
| ⇒ Binary Message ⎱ | 458 kB | 15:39:57.463 |
| ⇒ Binary Message ⎬—83 | 468 kB | 15:39:57.721 |
| ⇒ Binary Message ⎟ | 428 kB | 15:39:58.029 |
| ⇒ Binary Message ⎠ | 303 kB | 15:39:58.276 |
| ⇒ Binary Message —84 | 5 B | 15:39:58.423 |

FIG. 3

Source Buffer MetaData:

{
"startTimestamp": 1629327200903, — 88
"endTimestamp": 1629327210904, — 90
"processedRequests":[{ — 92
"requestStartTimestamp": 1629327201000,
"requestEndTimestamp": 1629327205000,
"startTimestamp": 1629327200903,
"startVideoTime": 0,
"endTimestamp": 1629327205904,
"endVideoTimestamp": 5
}, {
"requestStartTimestamp": 1629327205905,
"requestEndTimestamp": 1629327209905,
"startTimestamp": 1629327209905,
"startVideoTime": 5.001,
"endTimestamp": 1629327205904,
"endVideoTimestamp": 10
}],
"startVideoTime": 0, — 94
"endVideoTime": 10, — 96
"duration": 10, — 98
}

FIG. 4

SYNCHRONIZED PLAYBACK WITHIN A CLIENT INTERFACE UTILISING WEB TECHNOLOGIES

CROSS-REFERENCE TO RELATED APPLICATIONS

This application relates, and claims priority, to U.S. Provisional Application Ser. No. 63/108,823, filed Nov. 2, 2020, which is hereby incorporated by reference herein in its entirety.

BACKGROUND

Use of video monitoring has significantly changed based on the needs of video surveillance and network security. Traditionally, clients including a networked computer system with most resources installed locally, rather than distributed over a network, have been utilized for synchronization of cameras in order to provide the experience seamlessly. However, as the shift to new web technologies continues, synchronized (sync) playback of video recorded on several cameras has not followed. It is beneficial for security managers or operators to synchronize the playback of video footage from cameras in a variety of clients. By improving the accessibility of sync playback, operators and security managers can search for video in a more efficient manner.

One example of video monitoring includes an incident occurring at a commercial location, surveilled for security purposes. The operator informed of an incident at an approximate area and time, seeks to find the recorded incident quickly. The operator needs to search multiple cameras at once to find the camera that clearly captures the incident and/or track how the incident occurred by viewing multiple angles.

Another example includes an incident occurring over a span of multiple cameras. An operator wants to follow a suspicious person across multiple cameras over time. For example, a suspect picks up an item in one location, walks across multiple hallways, down a stairwell, and into another office. It may be important to determine whether the item was with the person across all the camera locations.

Traditionally, sync playback within a client web browser is not efficient and required clients with a networked computer system with most resources installed locally, rather than distributed over a network. As web technologies have evolved, they focus mostly toward single video playback with a relative time base. This causes issues when attempting to synchronize multiple data streams from disparate time bases. An operator may be dealing with days, weeks, months' or a year worth of video spanning multiple devices, which may be fragmented.

Thus, there is a need in the art to improve sync playback within a client utilizing web technologies. There is also a need in the art to implement sync playback within a client utilizing web technologies on a cloud security platform.

SUMMARY

The present disclosure is directed to improving sync playback for clients in a low-cost network computer that relies heavily on a server for its computation role to protect from security risks, provide lower maintenance and licensing costs.

The present disclosure is concerned with improving the workflow of searching recorded video for an operator to increase the speed of searching for an incident. The present disclosure includes a method for initiating sync playback within a client web browser by requesting a plurality of data and processing the plurality of data so that the plurality of data are compatible with the client web browser. A portion of data from the plurality of data is stored in an overflow buffer while a source buffer processes the plurality of data. The method may continue by generating a metadata object to facilitate sync playback on the client browser by determining what media data is in the source buffer of the client web browser that needs to be removed and searching for data using a first time format that is not natively supported by the client web browser and converting the first time format into a second time format that is natively supported by the client web browser. The method also includes synchronizing between videos using a controller from the generated metadata object, wherein each video from the plurality of videos is represented as a sequence in the source buffer of the client web browser.

BRIEF DESCRIPTION OF THE DRAWINGS

FIG. 3 is an exemplary screenshot of a client web browser's network tab illustrating outgoing requests generated by a request builder and the corresponding incoming responses in accordance with an embodiment of the present disclosure.

FIG. 4 illustrates an exemplary source buffer metadata in accordance with an embodiment of the present disclosure.

Figure 1A:
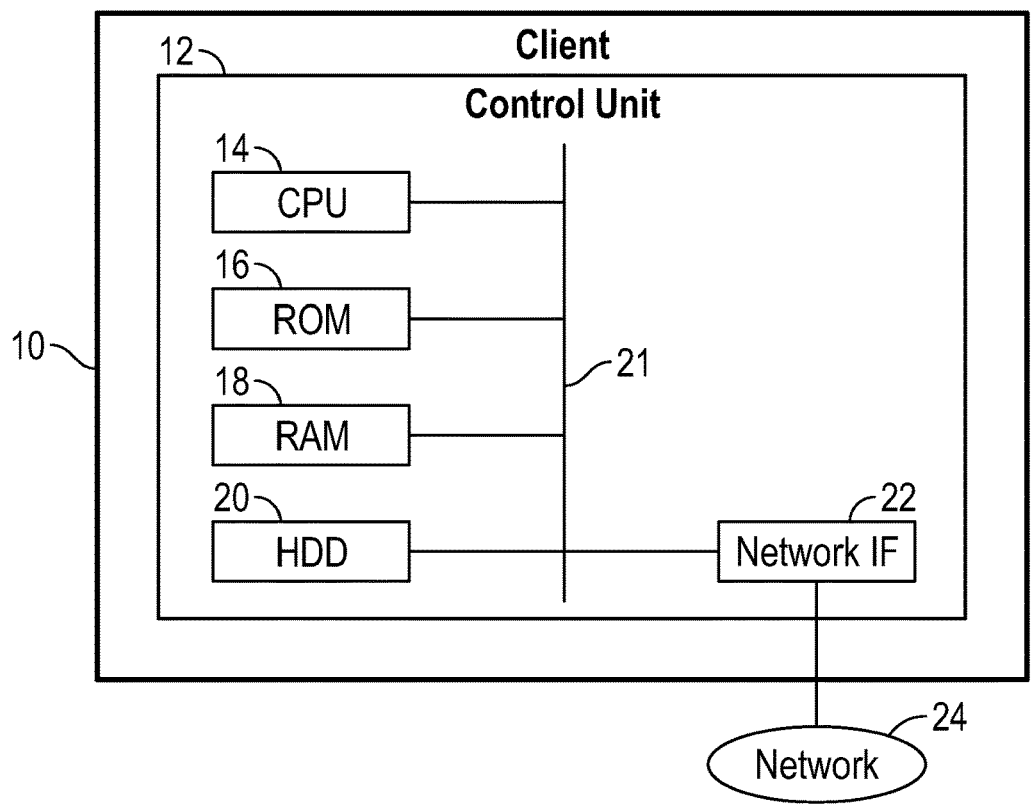
FIGS. 1A and 1B illustrate an exemplary hardware configuration of a client device and a server device in accordance with one or more aspects of the present disclosure.

Throughout the Figures, the same reference numerals and characters, unless otherwise stated, are used to denote like features, elements, components or portions of the illustrated embodiments. While the subject disclosure is described in detail with reference to the Figures, it is done so in connection with the illustrative exemplary embodiments. It is intended that changes and modifications can be made to the described exemplary embodiments without departing from the true scope and spirit of the subject disclosure as defined by the appended claims.

DESCRIPTION OF THE EMBODIMENTS

The present disclosure has several embodiments. With reference to the drawings, a method for sync playback in a client user interface (UI) is described according to an embodiment of the present disclosure. The method enables efficient syncing of multiple data streams from disparate time bases and disparate sources by converting current timestamps associated with video that are not natively supported by a client UI to a video offset value supported by the client UI using metadata generated in accordance with the present disclosure.

The client UI executes sync playback using a client web browser that exists on a client device. The client device may be a personal computer (PC), tablet, mobile phone or any device configured to run a software application including a video player. The client device is also configured to interface with a network or the Internet to communicate with a server device. FIG. 1A is an exemplary hardware configuration of a client device 10. The hardware configuration includes a control unit 12 including a CPU 14, a ROM 16, a RAM 18, an HDD 20, a system bus 21 and a network I/F 22. The CPU 14 controls operations of the entire apparatus by executing various types of processing by reading out a control program stored in the ROM 16. The CPU 14 is configured to execute the various steps required for sync playback on the client device 10. The RAM 18 is used as a main memory of the CPU 14, and a temporary storage region, such as a work area. The HDD 20 is a large-volume storage unit that stores image data and various programs. The system bus 21 is the method in which data is communicated between the CPU 14, ROM 16, RAM 18, HDD 20 and the network interface 22. The network I/F 22 is an interface that connects the client device 10 to the network 24. The client device 10 receives a processing request from another apparatus via the network I/F 22, and transmit/receive various types of information.

Figure 1B:
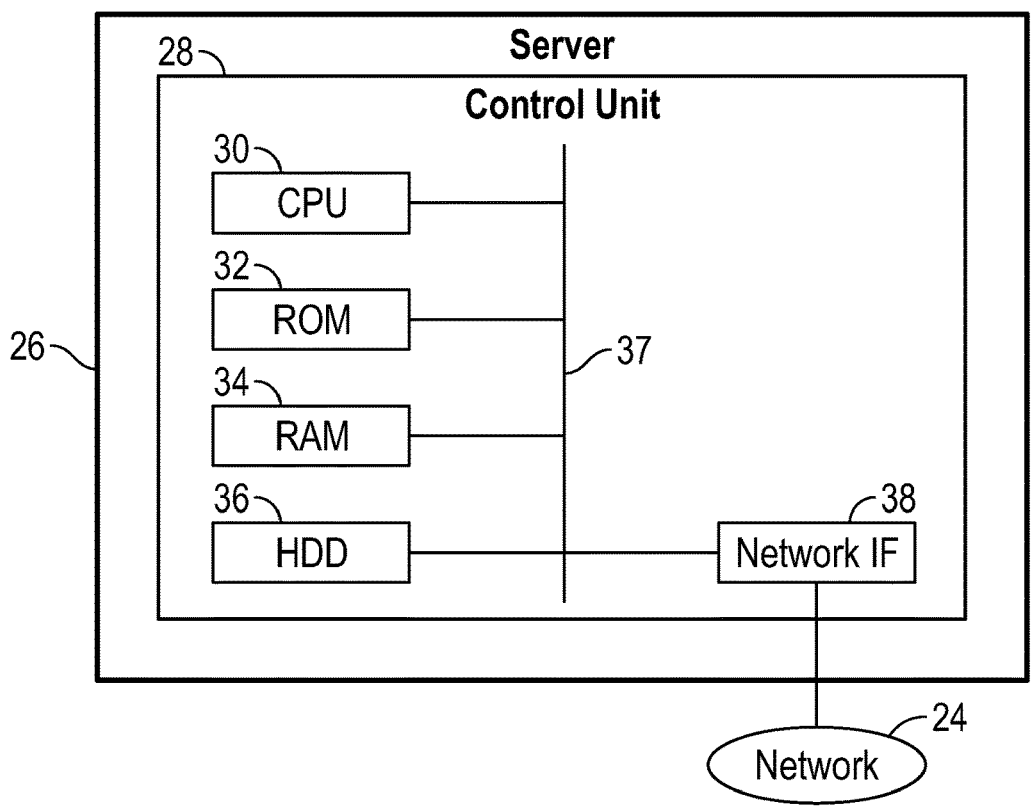

FIG. 1B is an exemplary hardware configuration of a server device 26 used to communicate with the client device 10 to efficiently enable sync playback of multiple different videos on the client UI. The hardware configuration includes a control unit 28 including a CPU 30, a ROM 32, a RAM 34, an HDD 36, a system bus 37 and a network I/F 38. The CPU 30 controls operations of the entire apparatus by executing various types of processing by reading out a control program stored in the ROM 32. The CPU 30 is configured to execute the various steps for sync playback on the server 26 side. The RAM 34 is used as a main memory of the CPU 30, and a temporary storage region, such as a work area. The HDD 36 is a large-volume storage unit that stores image data and various programs. The network I/F 38 is an interface that connects the server device 10 to the network 24. The server device 26 receives a processing request from another apparatus via the network I/F 38, and transmit/receive various types of information.

Figure 2:
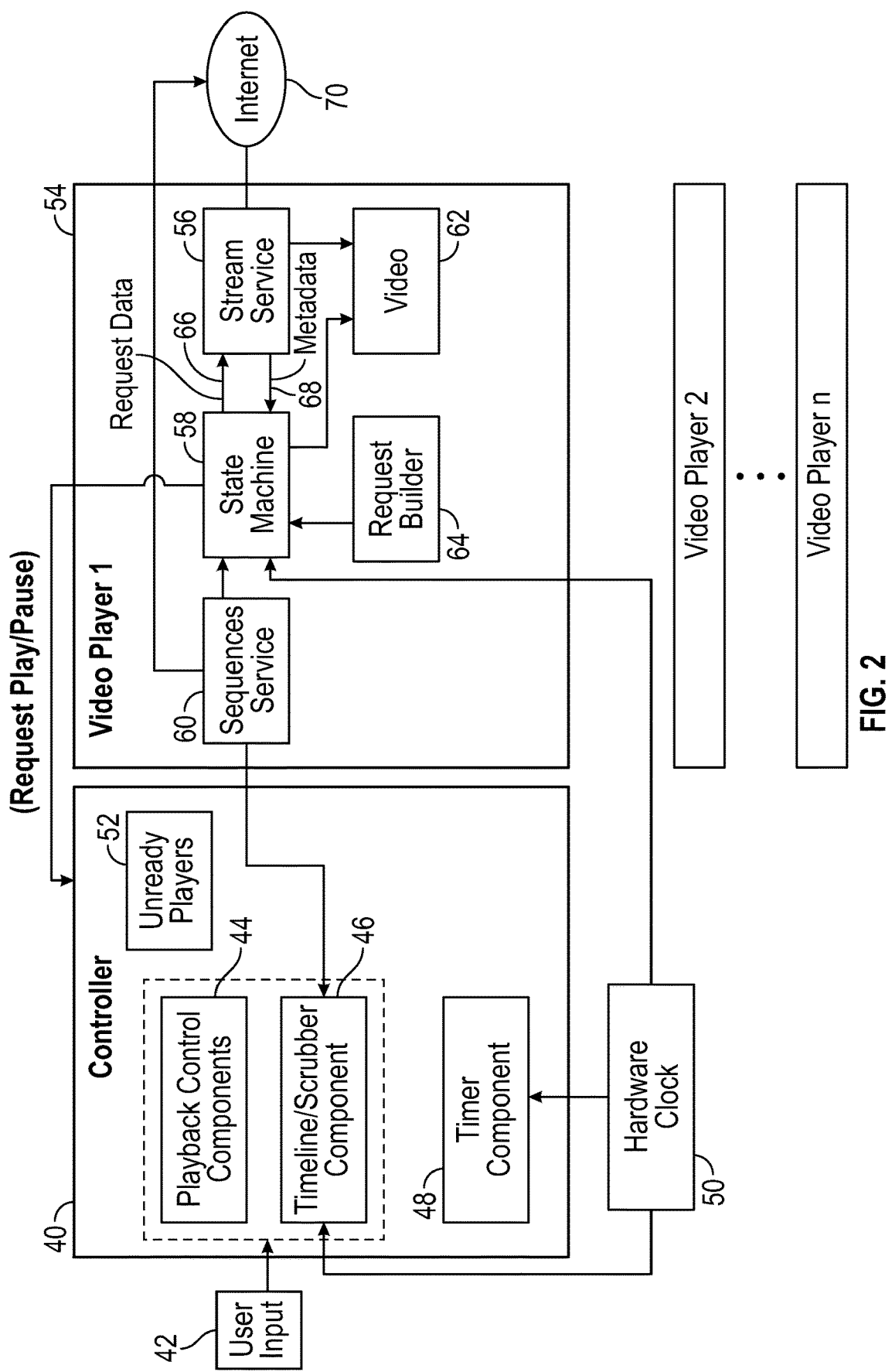
FIG. 2 is a block diagram illustrating an exemplary sync playback system architecture in accordance with an embodiment of the present disclosure.

FIG. 2 illustrates an exemplary system architecture for performing sync playback. The system architecture includes a controller 40 configured to receive a user input 42 via the client UI. The CPU 14 may function as the controller 40 to execute the various software components associated with the controller 40. The controller 40 includes playback control components 44 and timeline/scrubber 46 component enabling various user inputs. The various user inputs from playback control 44 and the scrubber 46 include play/pause, fast forward, skip back, select next sequence by way of example. The controller 40 also has a timer component 48 that enables videos with a date and time format to display on the client UI using offset values for the timeline. Although the date and time format is well known, the date and time format is not used for synchronizing multiple videos together. In order to avoid such issues associated with the date and time format for sync playback, a hardware clock 50 is in communication with the timeline/scrubber 46 component and the timer component 48. The hardware clock 50 is used for all time-related activities requiring high precision such as syncing videos, moving the scrubber on the timeline, retrieving data, pausing the video if the scrubber just moved in a gap, etc. The hardware clock 50 helps reducing (accumulative) latency and can be used for real-time and precision timing unlike the timer component 48. The timer is only necessary because the hardware-clock 50 is pull-based (you have to ask it for the current time) and to make this happen in the UI (by updating the view or triggering code paths).

The timeline scrubber 46 communicates with the hardware clock 50 to associate a current timestamp. The hardware clock 50 produces and understands timestamps. Natively, the hardware clock 50 would also just count in increments like a stopwatch. The video timeline displays those timestamps formatted like 3 pm . . . 4 pm or 10/19 . . . 10/25 (depending on timeline zoom level) as that makes the most sense to the end user and helps navigating through the video material. This is in contrast to normal video player timelines that display relative offsets (or time played) like Youtube: 0:05/3:47. The timeline of the present disclosure understands timestamps and the hardware clock 50 produces them. The issue is the video data itself in the SourceBuffer which is offset-based. Mapping between the two requires the metadata (object) that was captured during the "ingestion" phase. There are two types of sequences. Sequence/Sequences refers to available video data or recordings (this could be one giant continuous sequence/recording like a movie or a set of sequences fragmented with gaps). Then there is the SourceBuffer's "sequence mode". The SourceBuffer's sequence mode refers to how it stores incoming data. In "sequence mode", data is stored adjacent/right next to teach other. In contrast, "segment mode" preserves gaps between data chunks if any exist. The present disclosure does not use segment mode. For example, if two recordings A and B exist and both are five minutes long, however, recording B contains a one minute gap (no motion). As far as the SourceBuffer is concerned, recording A is five minutes long, but recording B is only four minutes long. Because the gaps disappear in sequence mode, the metadata is used to identify/locate any gaps. A sequence represents each video in a client web browser's SourceBuffer and the data can be drastically different. Given four videos of equal playback length, the actual data length of those videos can vary because they can contain gaps or "holes". The hardware clock 50 provides data in the form of a current timestamp that is used to generate metadata for sequences stored in the client web browser's SourceBuffer in order to enable sync playback. The metadata describes (video) data currently in the SourceBuffer. There is also metadata for the sequences but is generated on the server and the client periodically refreshes it.

Although, a hardware clock 50 is shown in the present disclosure to derive timestamps, a software version may be used as well, however, it should be noted that a software version may be less precise for sync playback. During sync playback the timestamp cannot be derived from the video itself because sync playback involves a multitude of videos and each video may look different from a data perspective. Each video can be of different durations. Furthermore, any gaps reduce the data length of the videos. This means that a single video to derive the timestamps as "master" video for all others is insufficient. The selected video may be too short and not cover the entire duration of the other videos. Additionally, using a "master" video would require too much data to be loaded in the buffer, so the buffer lengths are different. This is not an issue for a single video with a pre-defined duration like a movie. In those cases, the time is extracted directly from the video. So normal videos do not require any external clock. The external hardware clock 50 is offset-based, just like a stopwatch, it represents an ever-increasing value. The hardware clock 50 may start at 0 and count up in very small increments. The precision can be extremely accurate. Although the hardware clock is offset-based like a stopwatch, the hardware clock 50 has been modified in accordance with the present disclosure to produce timestamps and not offsets. In this case, it would be a series of ever-increasing timestamps.

The controller 40 is responsible for the synchronization between the videos. The controller 40 requests sync-related properties such as a current timestamp provided by the hardware clock 50. The controller 40 stores sync-related properties like the playing state the system is in (playing/paused), video players that are unready 52, etc. If all players are in a gap, the controller 40 will not pause sync playback but keep playing through the gap. The controller 40 maintains a list of unready players. When a player cannot play (typically because it is still loading data), it "requests a pause". The player sends an event to the controller 40 telling the controller that it is unready and the controller will make an entry in unready players list. If there is at least one entry in the list, the controller instructs all players to pause. When the player is ready again it "requests a play". The controller 40 will remove it from the list. If there are other players on the list, it will wait until all are ready and the list is empty before issuing a play instruction to all players again. The unready players 52 software component of the controller 40 communicates with all the video players of the sync playback.

Still referring to FIG. 2, a plurality of video players are shown. The video player 54 includes various software components. All the video players have the same software components and for the sake of brevity, only a detailed description of video player 54 is included. The number of video player's n corresponds to the number of videos selected for sync playback. The video player 54 is decoupled from all other players. Each video player is standalone and has no knowledge of the other video players. Each video player deals with its own states based on the channel data it owns/plays. Channel data is video data. Only the controller 40 knows about the other video players. The video players correspond to each channel or video included in sync playback. In a case where two channels or videos for sync playback are selected, the system architecture would include two video players that are in communication with the controller 40. In another example when four channels/videos are selected for sync playback, the system architecture would include four video players that are in communication with the controller 40. One video player per channel or video. Each video player is in communication with the controller 40, but the video players do not communicate with the other video players.

The video player 54 handles the retrieval of data via a stream service 56 component for its source of video 62. Each video player has an instance of the stream service 56. Each video player has its own connection to the server 26. In another embodiment, the video players may share a connection to the server 26. The stream service 56 component is a software component that deals with the data transmission between the client device 10 and the server 26, and transforms the data to a format the source buffer understands such as HTML 5 Source Buffer by way of example. Additionally, the stream service 56 produces a metadata object. The stream service 56 is also connected to the HTML5 video element via the Media Source Extensions API. The video player 54 determines what should happen on user interactions (such as seeks) and manages the preloading and the automatic removal of data from the SourceBuffer in the client web browser. The video player 54 manages the source buffer so that it does not run out of memory. If a user seeks, the video player 54 determines the next course of action for its owned data. This action may look different for different video players. In the seek case, the two main actions are (1) If data is already in buffer, just seek to it (instant), (2) If data is not in buffer, load from server 26 and then seek to it. A lot of complexity is present in the system due to the nature of the data, idiosyncrasies of involved web technologies, and business requirements. To manage this in a predictable way, the video player 54 internally makes use of a mathematical model of computation called a finite state machine 58.

The video player 54 includes a sequences service 60 software component that is in communication with the Internet 70 or a local network path. Essentially, there are two main endpoints: (1) One for retrieving the data and (2) One for retrieving sequence data. The sequence data are visualized in the client UI as two different bars in the timeline. One line representing recorded video data and the other line representing a recorded motion event. This data is crucial as it shows what the data looks like, how much video material is stored, where there are gaps in the video, etc. This information is used for data retrieval internally, gap management, etc. For the end user, this data is required to navigate efficiently through the available video material. The user can also see when there is no data and can just skip that section by using a jump to next sequence button.

The sequences service 60 is also in communication with the timeline/scrubber 46 component of the controller 40. The sequences service 60 loads the sequences. Each video player has an instance of the sequences service 60. The video player 54 manages the retrieval of sequence data for their respective video 62. Once the video player 54 has that data, it passes that data to the controller 40 for display in the timeline. Each video player fills its own row in the timeline with two different bars, one bar for recorded video data and another bar for detected motion. The video player 54 then continuously refreshes the sequences data every 20 seconds by way of example. The refresh time is arbitrary and may be set to any amount of time. The sequences data needs to be refreshed because "time never stops" and video is being recorded. If the end user loaded sync playback a minute ago there may have been up to one minute of more video material recorded since. The state machine 58 is not concerned with the data but rather with the control state of the video player 54. The state machine's 58 purpose is to manage player states and the transitions between those states. The state machine 58 does have access to relevant data like sequences data to make certain decisions like not trying to load data when there is no data (a gap). Instead, the state machine 58 preloads the next available data. The state machine 58 also knows the playing state, so after loading data it looks at the controller's 40 playing state. If "playing=true", it starts playing the video, otherwise it stays paused. The state machine 58 deals with both control (Do I need to play? what do I need to do to seek to that point?) as well as data states (Do I need to load more data?). The state machine 58 is configured to transition into the "paused" state and trigger a workflow through the controller 40 to halt all the other videos in the playback array. This allows a single control plane across multiple state machines. The state machine 58 is in communication with the video source 62 obtained from the stream service 56. The stream service 56 creates and owns the (source) buffer. The video player 54 will always get an updated metadata object whenever the source buffer has changed (data added or removed). The video player 54 does not directly operate on the source buffer but gets metadata to see what the source buffer looks like internally. It can then call methods on the stream service 56 if the player needs the buffer emptied. The stream service 56 software component will then take care of that for the video player 54.

The state machine 58 communicates with the hardware clock 50 to receive time information. The state machine 58 is an implementation detail of the video player 54. The state machine 58 is a software component of the video player 54 in which a group of pictures (GOP's) transmitted toward the client and are reassembled in a buffer, which may then be read by the web browsers standard libraries in order to provide a viewable experience across multiple video streams in a synchronous manner.

The state machine 58 exclusively deals with the streaming of data based on the current system state, for example, whether it is playing, paused, or seeking. The state machine 58 invokes services when transitioning into certain states. One of those services uses the stream service 56 to load the initial data for seamless playback (the priming state). If the current timestamp happens to be in a gap it will load some of the previous data to show a still image with a "No Data" overlay. The state machine 58 also preloads some of the next data if available. The video player code will cause the necessary transitions in the state machine 58. However, the stream service 56 will ensure it valid to do so.

The stream service 56 provides all services around the streaming of video data. The stream service 56 sets up a WebSocket connection to the server and handles all the low-level details of the bi-directional data transfer. The WebSocket connection is a communications protocol that enables interaction between a client web browser (or other client application) and a web server to facilitate real-time data transfer from and to the server. The WebSocket protocol is the current chosen protocol to move data between the client and server. However, sync playback is not limited to this protocol. It could be any other means like WebRTC or just simple HTTP request with long polling.

The state machine 58 is also in communication with a request builder 64 software component to receive requests for converting video time corresponding to sequences of video into an actual timestamp. The request builder 64 deals with timestamps and ranges only. The conversion information between timestamps and video time is contained in the metadata object, which is generated by the stream service 56 mentioned above. Because the stream service 56 deals with data transmission and retrieval, it sees all data coming back from the server 26 and thus is capable of generating this kind of information. The request builder 64 receives both a timestamp and sequences data. The request object is passed to the stream service for data retrieval. The request object contains the "from" and "to" values (the bounds of the chunk of data requested). The request builder 64 is a utility that handles all the data idiosyncrasies.

For example, because of the sequence data the request builder 64 knows about gaps. The request builder 64 will always try to return from/to pairs that are about four seconds in duration. However, if the timestamp provided is at the end of sequence and only two seconds are left in the sequence, then two seconds are returned. The request builder 64 will also completely ignore any requests that are entirely in a gap. There are a few other edge cases so essentially it handles all those cases to get the correct data from server. The video time is converted into an actual timestamp because the video time is not natively supported by the client UI. Video time is a term to describe that time in terms of videos is offset-based. It always starts at 0 seconds and then ends at some offset time 7200 s or 120 minutes in a case where the video is two hours long (the duration of the video). The actual timestamp is supported by the client UI. For example, given the following request: {from: 1629736534000, to: 1629736538000} which has a duration of 4 seconds. The video player 54 will get back a set of chunks (usually 4 or 5 chunks). The chunks are inserted into the source buffer after the current end video time of the buffer is retrieved. Each chunk is a Group of Pictures (GOP).

Upon receiving the requests from the request builder 64, the state machine 58 requests data 66 from the stream service 56. The stream service 56 is a piece of software functionality that deals with one specific thing or group of things. In this case, getting and preparing the video data 62 for consumption by other software. The stream service 56 then converts video time to actual timestamps by generating metadata 68 that is then transmitted to the state machine 58 as buffer metadata. Stream service 56 is also client-side in the browser. The stream service 56 functions as a data manager. The metadata represents what is stored in the buffer.

Referring now to FIG. 3, an exemplary screenshot 72 of the client web browser's network tab illustrates the outgoing requests generated by the request builder 64 and the incoming responses. The incoming responses include binary data each containing GOP. The screenshot includes three "from" "to" pairs 74, 79 and 82. Reference numerals 74, 79 and 82 represent the outgoing requests and below each outgoing request includes their responses (75, 80, 83). The last response in each request 76, 81 and 84 are marker messages that signal all data has been transmitted. The marker message is the binary message that is about 5 Bytes in size. The size or length of the messages are in the column titled length 77 and the column time 78 represents the offset value of a particular message. The marker messages 76, 81 and 84 determine when to close the metadata object. Each from/to pairs represent a chunk of video data approximately four seconds in length. The from/to pairs (74, 79, 82) are extracted from the sequences data. The binary messages further divide the chunk of video data to sequences of about one second or less. The marker message from each from/to pair determines whether the request is complete for a particular chunk of video data. If the request is complete, according to the last binary message, an end timestamp is set. The end timestamp indicates that the from/to pair is complete. After the request is complete, the data is in the source buffer and a metadata object is generated containing all the information for that request. The metadata object represents an entry under the "processedRequests" key. The request builder 64 receives both a timestamp and sequences data. The request builder 64 is configured to return a request object to the state machine 58. The request object contains the "from" and "to" values (the bounds of the chunk of data requested).

Referring back to FIG. 2, the stream service 56 has two main functions. The stream service 56 handles the low-level details of talking to the streaming backend (server). The stream service 56 requests chunks of video and then processes those chunks so that the client web browser can understand them. Furthermore, the stream service 56 utilizes a queue-like data structure referred to as the "OverflowBuffer" to handle what is known as API backpressure—this occurs when data retrieval is faster than data processing. Additionally, the stream service 56 builds up a metadata object that is central to making sync playback happen in accordance with the present disclosure. The stream service 56 enables and informs what data is in the client web browser's SourceBuffer and how to manipulate (e.g. removal of data) and use it (e.g. seeking based on timestamps, which is not natively supported). Client code will have access to a small set of methods exposed by the stream service 56 for data retrieval and removal.

The stream service 56 processes the messages by sending it through a function pipeline applying different transformations and conversations during each step. The stream service 56 converts long timestamp formats to simple JavaScript numbers. The stream service 56 also handles the time mismatch between from/to ranges from the sequence REST API and the actual GOP (group of pictures) durations getting returned from the streaming service and transforms the actual WebSocket messages by removing the 'isLastChunk' marker messages and converting the ProtoBuf binary data to Unit8Arrays that the SourceBuffer understands.

Once the messages are in an appropriate format, the video is appended to the SourceBuffer or queued in the OverflowBuffer if the SourceBuffer is busy processing a previous request. Every chunk goes through the OverflowBuffer. If the SourceBuffer can process it, then it gets immediately passed to the Source Buffer. If the SourceBuffer is busy, the OverflowBuffer will queue it and will queue any subsequent chunks. Once the OverflowBuffer is notified by the SourceBuffer that it is ready again, it will pass the next (oldest) chunk to the SourceBuffer. This process continues until the request is completed (marker message received). During this process, the important SourceBufferMetaData object is also constructed. The SourceBuffer itself provides two events that the Stream listens to: (1) updatestart and (2) updatedend.

When the stream service 56 processes a request, each request is up to 4 seconds in length, this is an arbitrary number and can be any other number. However, four seconds appears to be a good compromise between enough data to avoid stalling and small enough to avoid long wait times. The stream service 56 will keep track of each GOP being appended to the SourceBuffer.

FIG. 4 displays an exemplary source buffer metadata 86. The SourceBufferMetaData 86 object is updated with the following information and emitted when the request is complete:
startTimestamp (of first GOP) 88
endTimestamp (of last GOP including duration) 90
startVideoTime (the startTimestamp's second-based representation in the SourceBuffer) 94
endVideoTime (the endTimestamp's second-based representation in the SourceBuffer) 96
duration (the entire duration of the video data in the SourceBuffer) 98
processedRequests 92; an array of metadata for each request currently in the SourceBuffer (which is in sequence mode)
startTimestamp
endTimestamp
startVideoTime
endVideoTime
requestStartTimestamp (request's from which can be different to actual startTimestamp)
requestEndTimestamp (requests' to which can be different to actual endTimestamp)

The SourceBufferMetaData object 86 enables all the operations on the video data (play, seek, skip, remove, preload, etc.). The timeline and controls are timestamp based as opposed to the second-based/relative time SourceBuffer. The SourceBufferMetaData 86 allows a user to seek, load and play videos in synchronization at certain points in time based on timestamps regardless of whether the data contains gaps or not. The SourceBufferMetaData 86 is a way for the code (sync playback) to look inside the SourceBuffer and manipulate it through its APIs for specific needs. The metadata provides a solution to the time conversion issue associated with playing multiple videos synchronously. For example, a security camera may record an incident on a particular date and time, then that date and time is converted into a long format timestamp such as javascript timestamp by way of example. The timestamp is then encoded in the data and stored. However, a video recording is based on length like a movie, television show or YouTube clip by way of example. Unlike the movie, television show or YouTube clip, the security or surveillance camera also contains data indicating "when" something happened, so a user may view the incident or event. The challenge being how to find those incidents/events when given a time and date represented as a timestamp, if all that is included on the disk is length (offset times from start to end). The user may request to view video from yesterday between 3:13 pm and 3:18 pm by entering date components via a user interface that accepts user's time and date. Thus, when this occurs, a conversion mechanism is required to find that bit of video. The metadata is the conversion mechanism that enables finding the video requested.

The hardware clock 50 is the native clock that is offset based, i.e., starts at 0 and counts up with tremendous precision. However, offset time is not what is needed, what is needed is to produce timestamps. Thus, a custom wrapper is used to set playback rate, start (from timestamp), pause, resume (from timestamp), cancel, current time and update time with respect to the offset time provided by the hardware clock 50. The location of the timeline/scrubber corresponds to the timestamp. The custom wrapper enables the hardware clock 50 to produce timestamps using initial timestamp plus offset time.

The client user interface is configured to enable a user to select sync playback for a plurality of channels. Each channel may correspond to a camera or video feed. Sync playback requires at least two channels or videos. The present disclosure is directed to sync playback with at least two channels. In one embodiment, two or more channels from a "View" or "All Channels" are contemplated. In another embodiment, up to nine channels may be synchronized for playback by way of example. It is important to note that the more channels selected for sync playback, the greater the hardware constraint. Additionally, browsers usually have limitations in how much data to buffer. Each additional video would vie for those resources. There are also factors such as bandwidth that would make playing more than four videos impractical in terms of user experience. This is not a limitation in the video player itself. The embodiments discussed throughout the present disclosure are directed to sync playback up to 4 channels by way of example. Sync playback for four channels or less is not too demanding on current hardware capabilities. Although sync playback requires two videos, the video player is configured to playing a single video. In the case of a single video, conversion between timestamps and video offsets still apply.

Figure 5:
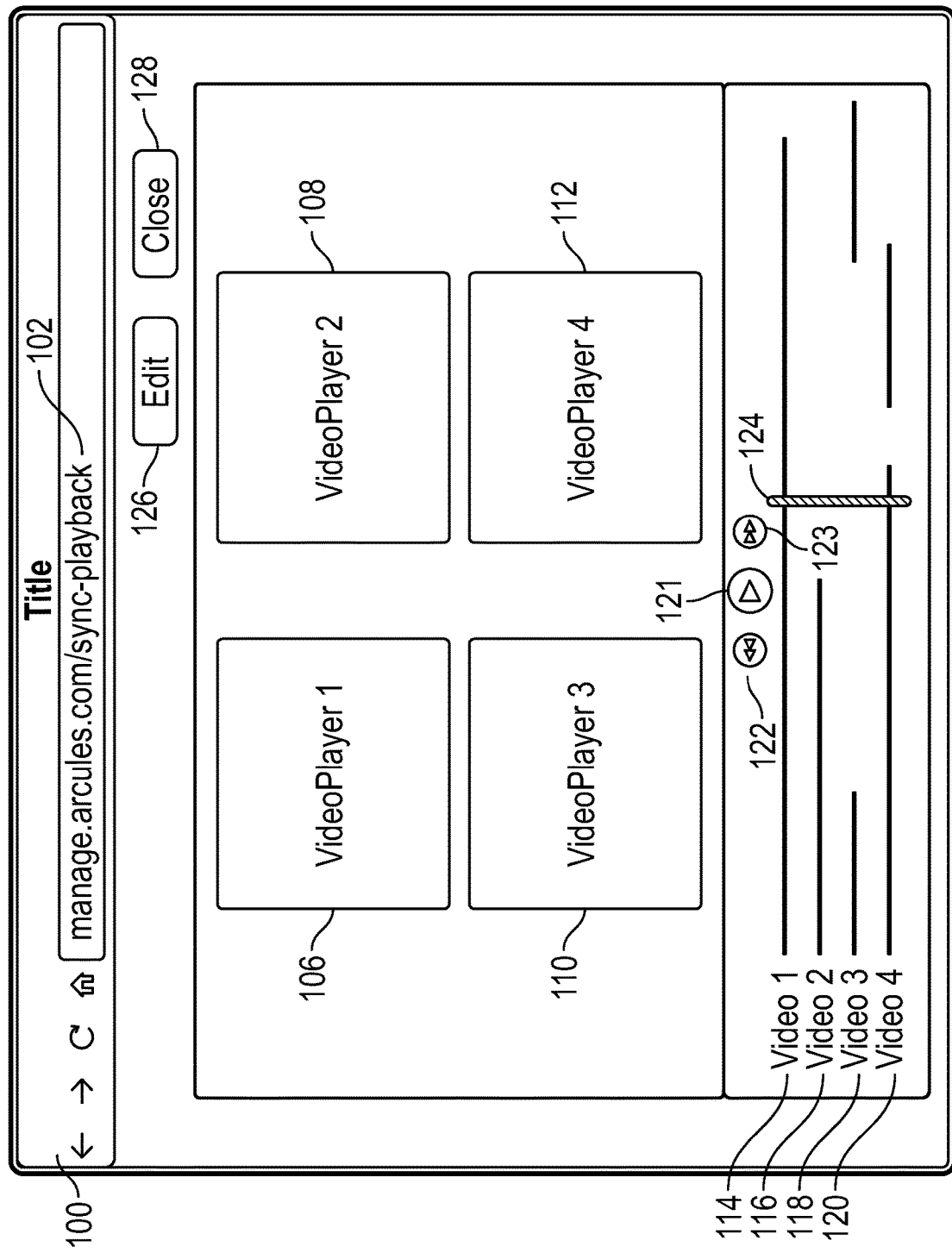
FIG. 5 is an exemplary user interface displayed on a client web browser for sync video playback of multiple videos in accordance with an embodiment of the present disclosure.

Referring now to FIG. 5, an exemplary client user interface (UI) 100 is shown. The client UI in this example is a client web browser configured for sync playback. A user may access the sync playback UI 100 by using a device such as a mobile phone, tablet or PC to access the devices web browser or a software application installed on the client device. The UI 100 may be accessible by URL 102 on the client web browser. The UI 100 of the client web browser may include an edit button 126 for removing or adding a channel to the sync playback. For example, the client web browser in FIG. 1 includes four video players, if the user selects the edit button, the user may reduce the channels shown to display three video players or less. Alternatively, the user may increase the channels shown to display five or more video players. The user may not be able to select sync playback if only one channel is in view on the UI 100. The UI 100 of the client web browser also includes a close button 128 for terminating sync playback. The present disclosure does not include an upper limit to how many video players to select for sync playback. However, selecting more than four video players requires additional processing and memory to smoothly implement the sync playback in an efficient manner.

In the exemplary UI 100 of the client web browser, four different video players 106, 108, 110 and 112 are displayed for sync playback. The four video players allow the user to quickly find a recorded incident that occurred at an approximate area and time in order to search multiple cameras at once to find the camera that best captures the incident or to track how the incident occurred by viewing multiple angles. The user may also view the four video players to track an incident occurring over a span of multiple cameras. The UI 100 of the client web browser enables a user to change which channels/cameras are selected in a synchronized view without losing their point in time. When the user is in an editing mode, the video player takes a snapshot of where the scrubber 124 is located along the timeline which represents the current time and what the originally selected cameras/videos were. Now the user may remove, add or select different cameras. When the user confirms their changes, the previously saved timestamp/scrubber position is used as the starting point for when the sync playback starts up again. Data will be retrieved from that point in time for all videos, the scrubber 124 placed at that time in the timeline.

Users are able to view timeline 114, 116, 118, 120 and sequence (recording/motion) for each channel in a shared video scrubber 124 for the channels that are synchronized. The user may zoom in and out of the timeline because it can span a large period of time. Users are able to set playback controls for play, pause, fast forward and go back 10 seconds. Users are able to go to the next or previous sequence. While searching through video, the user is directed to the next available sequence (recording or motion). Users are able to set playback speed either faster or slower. The user may also have the option to export for a single camera. The user may pick any of the selected cameras and enter a full screen mode if they found a good angle and want a closer look. Another feature allows the user to select full screen mode for a single camera. While in full screen mode for a single camera, the single camera controls the sequences that are displayed.

The UI 100 includes various control components 122 including a play/pause button, fast forward button, reverse button, timeline and date picker (not shown) for the user to control the sync playback as briefly discussed above. When the user selects skip back, jump to previous next sequence and dragging the scrubber 124, it triggers a seek function within the methodology for sync playback. The seek function requires that sequence data is loaded in the source buffer of the UI 100 on demand by initially emptying the source buffer then filling the source buffer based on the user's input during the seek function. Any seek action according to the present disclosure empties the buffer first so that data will still be sequential in the buffer as opposed to disjointed. Emptying the buffer also provides an opportunity to free up memory space as well as avoiding errors such as buffer overflows by way of example. When the user selects the pause button, it triggers a global pause function that pauses all the video players. When the user selects the play button, it triggers a continuous request for sequence data to preload in the source buffer of the UI 100 to prevent delay of the sync playback. While the video player is playing, it potentially preloads in a paused state if a threshold is met. The threshold is based on how much data has been played versus how much data is left in the buffer. Then it is determined if the ratio exceeds a defined threshold (for example, currently 80% of data has played).

The UI 100 provides a timeline for all four video players selected for sync playback. The first video player 106 corresponds to displayed timeline 114 that shows sequence data existing for almost the entire range of available data for sync playback. The timeline 114 includes a gap towards the end of the timeline indicating that no data is available from that particular channel for sync playback. Timeline 116 corresponds to the second video player 108. The timeline 116 for video player 108 indicates that data exists for about the first half of the entire range of available data for sync playback. No data for the remaining second half of the entire range is available for sync playback. The third video player 110 corresponds to timeline 118 including video data at the beginning and end of the entire range with a gap in between that indicates no video data available for sync playback during that portion of the timeline 118. The fourth video player 112 corresponds to the timeline 120 including two gaps throughout the entire range of sync playback. The entire range of each of the timelines represents an arbitrary amount data available for sync playback. The user may select the amount of data available for sync playback. The entire range may represent one day, one week, one month, one year or more depending on a user or system preference. The timelines displayed on the UI 100 represent a range such as a year's worth of sequence data by way of example, that is available to the user for sync playback amongst the video/channels selected. It is important to note that the video player will never load more than a small amount of video data. The amount of data that is loaded on the video players depends upon the position of the scrubber 124 at a given point in time to conserve bandwidth and resources. The sequence data on the other hand is loaded completely so the user can navigate and see how much data there is stored. It is important to note that although a year's worth of sequence data is requested, different cameras or channels selected may have gaps in sequence data due to user settings. For example, if recording is based on motion detected by the cameras, then the camera only records when there is motion.

If the recording is based on a schedule, then it only records when it is set to record, between 6 am and 10 am for example. These types of user settings generate gaps in the sequence data.

The vertical timeline scrubber 124 is perpendicular to the player timelines (114, 116, 118, 120) of the various videos selected for sync playback. The timeline scrubber 124 is a vertical bar that tracks across all the videos selected for sync playback. The timeline scrubber 124 allows the user to seek out a particular date and time for sync playback by moving the timeline scrubber forward or backward. The movement of the timeline scrubber 124 by the user triggers the seek function. In the present example of FIG. 5, the timeline scrubber 124 intersects the timeline of videos 1 (114) and 4 (120). For videos 2 (116) and 3 (118), there is no data appearing on the timeline where the vertical timeline scrubber 124 is positioned. In this example, sync playback would show videos 1 and 4 on the corresponding video players of the UI 100, while no data is shown for videos 2 and 3 in their corresponding video players of the UI 100. However, as sync playback continues and the vertical timeline scrubber advances to a position where data exists for videos 2 or 3, the corresponding video player will play the newly available sequence data. Conversely, if the vertical timeline scrubber advances to a position where no data is available for videos 1 or 4, then sync playback will pause for either videos 1 or 4 or both if both timelines are missing data.

Figure 6:
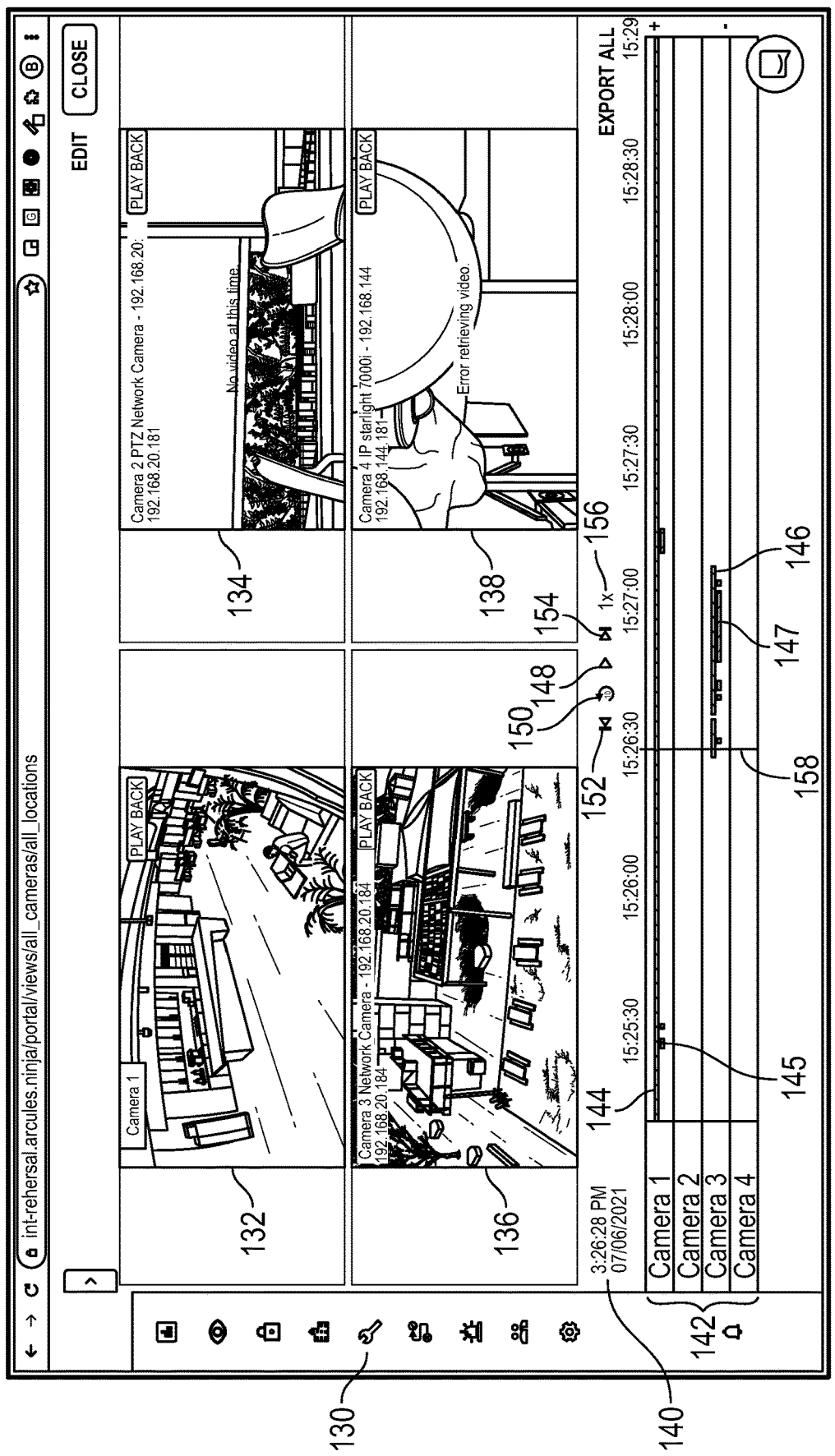
FIG. 6 is another exemplary user interface displayed for sync playback in accordance with an embodiment of the present disclosure.

Referring now to FIG. 6, another exemplary UI 130 is illustrated. Video data recorded by a security camera for example, includes a date and time format 140 representing when video is recorded. Each point along the entire range of the timeline for videos (132, 134, 136, 138) of the four video players on the UI 130 represents a date and time recorded by the security cameras. The timelines of the four videos communicate with the hardware clock to convert the date and time format 140 in order to represent the entire range using offset values with an initial start time and an end time of the range available for sync playback on the UI 130. In this embodiment, the user is able to view timeline (144, 146) for recorded video data as well as a timeline 145, 147 for motion within the recorded video data. Each camera may include two timelines for the channels that are synchronized.

The timelines of the security cameras are represented by offset values. The vertical timeline scrubber 158 is in communication with the hardware clock. In one embodiment, the hardware clock is sourced from the sound card of the device used by the client to access the client UI 130. The hardware clock is much more accurate than the timer component used for the offset values of the timelines for the security cameras (132, 134, 136, 138). The timer component is not as accurate because it is only used for the UI 130, mainly for display purposes. The timer component is essentially a way to connect the hardware clock with the rest of the code. It is a method for asking the clock for the current time and updates the timelines of the UI 130 accordingly by moving the scrubber 158. The vertical timeline scrubber 158 is integral in the sync playback because it shows what data and time the user is currently looking at in the video. If someone stole a laptop in the video they would know when that event happened by looking at the scrubber 158 and timeline. The moment sync playback is initiated, the hardware clock starts similar to a stop watch so that the offset values along the video timelines of the UI 130 may be associated with the hardware clock. The UI 130 includes various player controls including a previous sequence button 152, a skip button 150, a play/pause button 148, a next sequence button 154 and a button 156 to adjust playback speed. It should be noted that the skip button 150 skips in increments of ten seconds which is an arbitrary value that may be adjusted to other values. For security camera 1 (132), there is sequence data for the entire range of timeline 144 that is displayed in the UI 130. Directly below the sequence data timeline 144, there is the timeline 145 indicating recorded motion. For security camera 2 (134), there is no sequence data for the range that is displayed. For security camera 3 (136), there is some sequence data within the range that is displayed, the sequence data is represented by timeline 146 as well as a recorded motion timeline 147 displayed directly below timeline 146. The fourth security camera 4 (142) does not include a timeline because there was an error retrieving video.

Figure 7A:
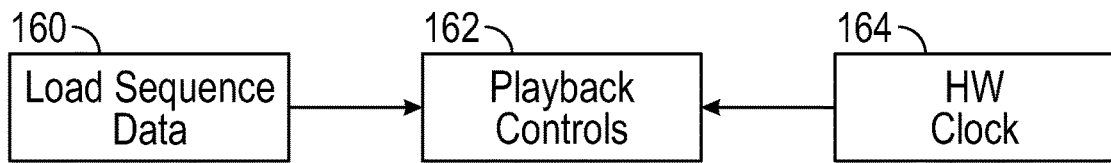
FIG. 7A is block diagram illustrating interaction between playback controls and the hardware clock for loading sequence data for sync playback in accordance with an embodiment of the present disclosure.

Referring now to the block diagram of FIG. 7A, sync playback initiates when a user selects multiple videos to playback in the UI. Upon selecting at least two videos for sync playback, sequence data corresponding to the videos is loaded by the video players. The load sequence data 160 may be updated every 20 seconds to ensure that there is sufficient content for the sync playback. Sequences have an end, but the camera keeps recording and as time goes on more data is available. Updating the sequence data ensures that the user can view newly added data as well while in sync playback. The sequence data may be loaded up to an arbitrary limit such as one year of data by way of example. The updating of the load sequence data 160 every 20 seconds is merely an example and updating of the load sequence data step may occur at any interval. A sequence can be any duration in length. However, in terms of data retrieval sequences, the data retrieval sequences are chunked and those chunked may represent a four second chunk of video data. For example, if a sequence is a day long, there are about 21600 chunks. The chunk of video data may represent other lengths and is not constrained to four seconds. The sequence data 160 is then transmitted to the playback controls 162 component for viewing of the multiple videos on the UI. Each video player sends their sequences and updated sequences to the controller; the controller can render the two timelines for each video player.

The playback control 162 component receives a current timestamp from the hardware clock 164. During sync playback when the user selects a particular portion to view by using the vertical timeline scrubber in the example where there are four videos, each video will have different lengths for the point where the user seeks sync playback. However, when the videos play on the UI, the timeline shows an offset time. The current timestamp and the offset times of the video are used to generate metadata that converts the current timestamp and the offset times to a time that allows for sync playback in the UI in an expeditious manner.

Figure 7B:
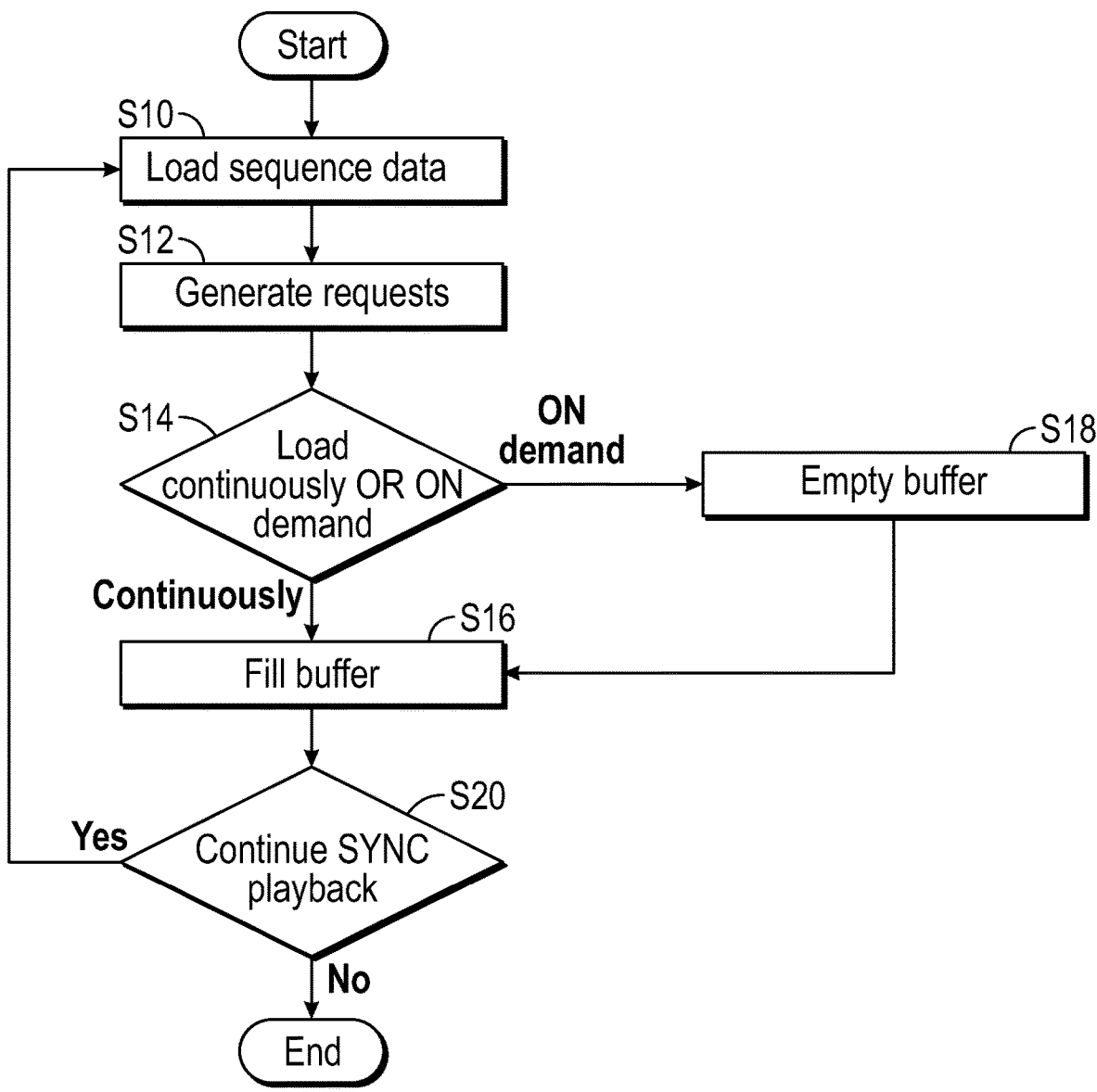
FIG. 7B is a flowchart illustrating steps for loading sequence data and generating requests during sync playback in accordance with an embodiment of the present disclosure.

Referring now to FIG. 7B, a flowchart illustrating the steps for loading sequence data 160 described in FIG. 7A in the UI. The initial step occurs when the user selects multiple videos for sync playback. This initiates the load sequence data step S10. The load sequence data step S10 is continuously performed during sync playback until an arbitrary limit such as one year of video data is obtained or until sync playback is terminated. In the next step S12, the sequence data is used to generate requests based on the sequence data. The requests based on sequence data are generated by building a list of from/to pairs as shown in FIG. 3. The from/to pairs correspond to chunks of video data with a start time and an end time. The from/to pairs ensure correct data that is sent over to the server associated with the streaming service. Once the requests are generated in step S12, the video data is loaded onto the video player of the UI. In step S14, it is determined whether the video data is loaded continuously or on demand. When the video data is loaded continuously, the video data is preloaded on the video player of the UI to prevent stalling of the sync playback. Alternatively, when a user interaction such as a seek function is performed by the user moving the vertical timeline scrubber for example, this action requires that the video data is loaded on the video player of the UI on demand. In step S14, it is determined whether the video data is preloaded (continuously) or seek (on demand). If it is determined in step S14, that the video data is preloaded, then the fill buffer step S16 is executed. Next, it is determined whether sync playback is still occurring in step S20. If it is determined that sync playback has terminated, then the loading of sequence data is terminated. If it is determined in step S20 that sync playback is still playing, then the process returns to step S10 to continue loading sequence data. In step S14, if it is determined that the seek function was performed, then in step S18 the buffer is emptied. Subsequently, in step S16 the buffer is filled.

Figure 8A:
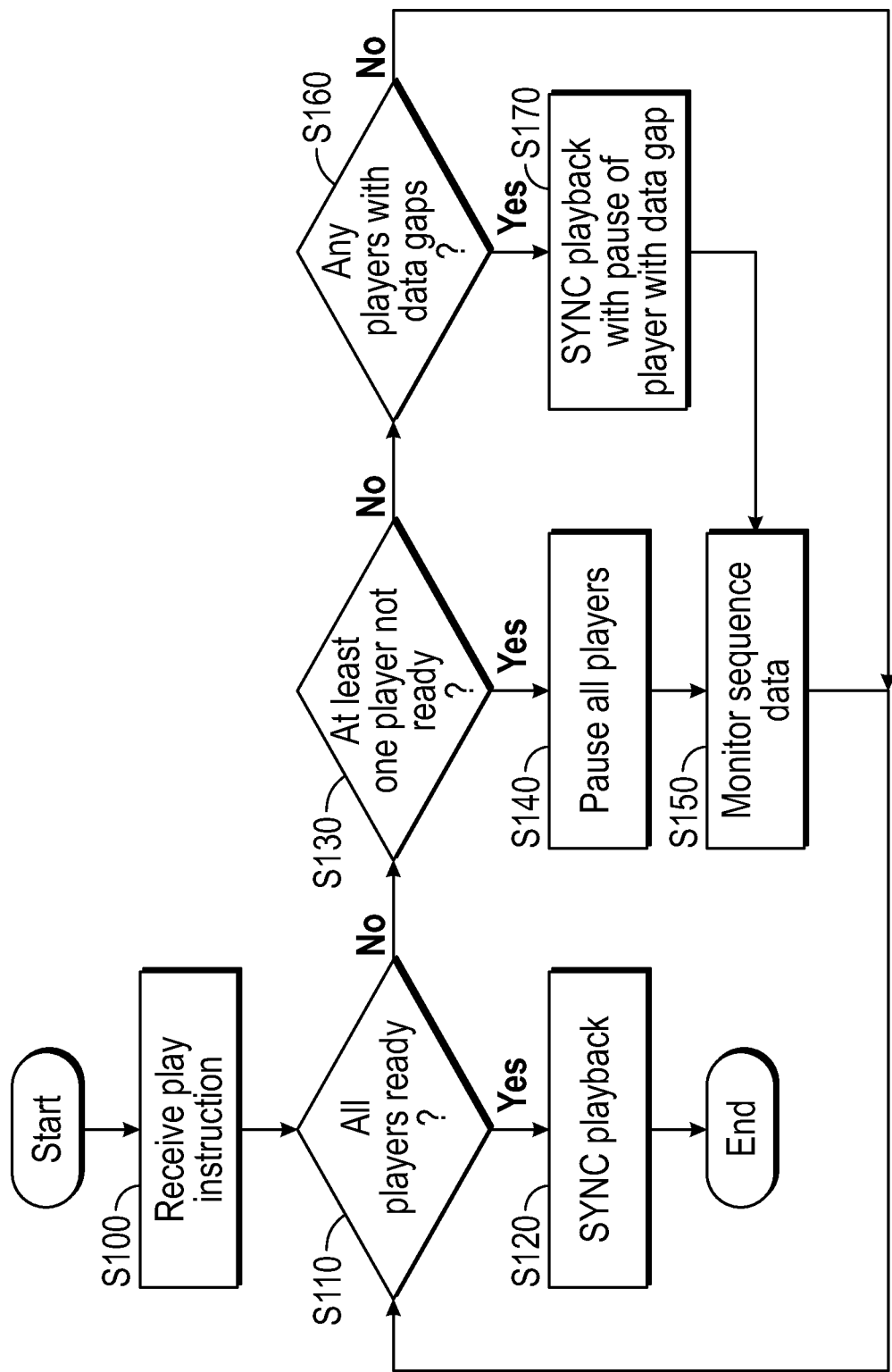
FIG. 8A is a flowchart illustrating steps between a controller and a plurality of video players for initiating sync playback upon receiving a user input to play in accordance with an embodiment of the present disclosure.
Figure 8B:
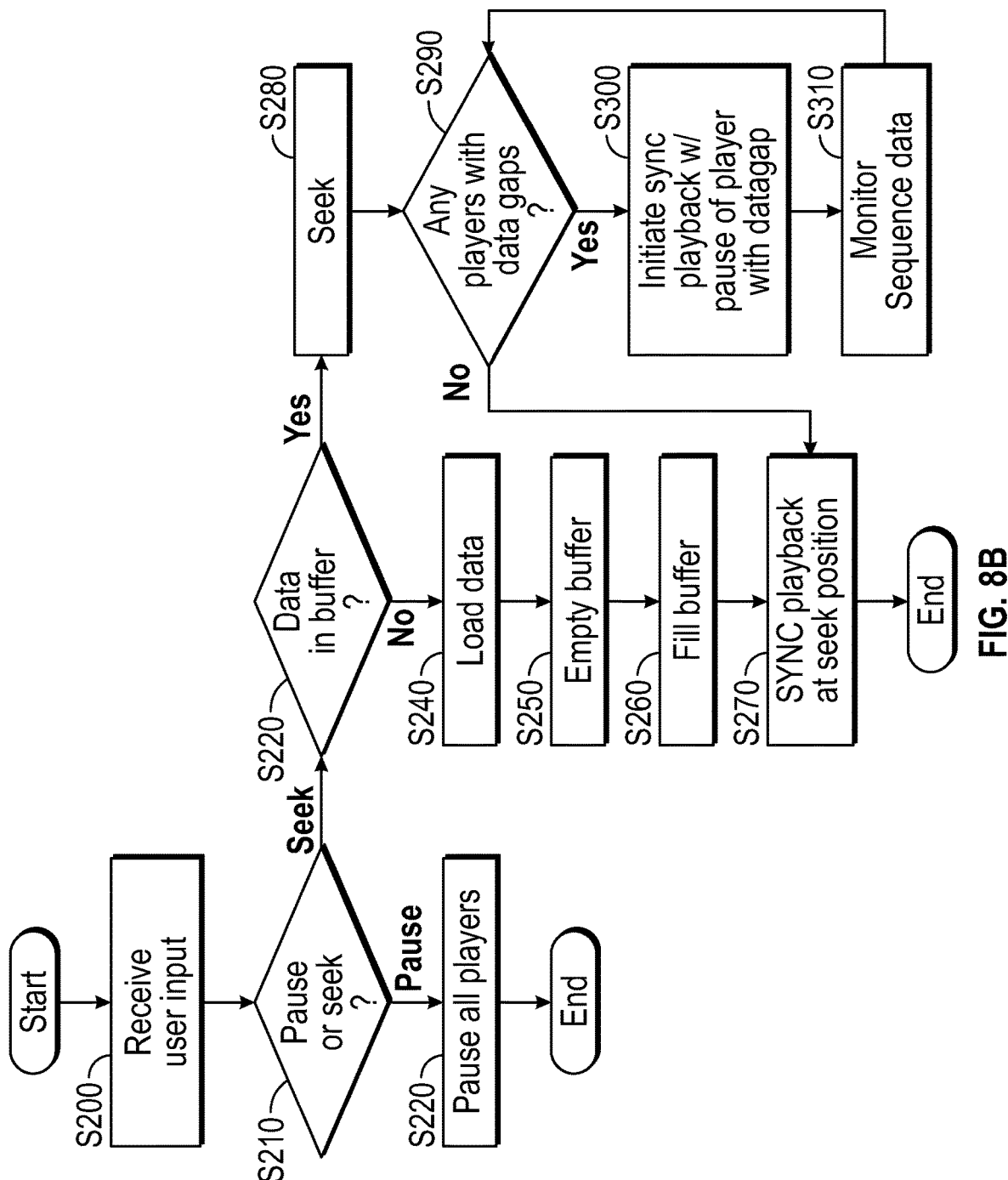
FIG. 8B is a flowchart illustrating steps between the controller and the plurality of video players upon receiving a user input other than a play instruction in accordance with an embodiment of the present disclosure.
Figure 8C:
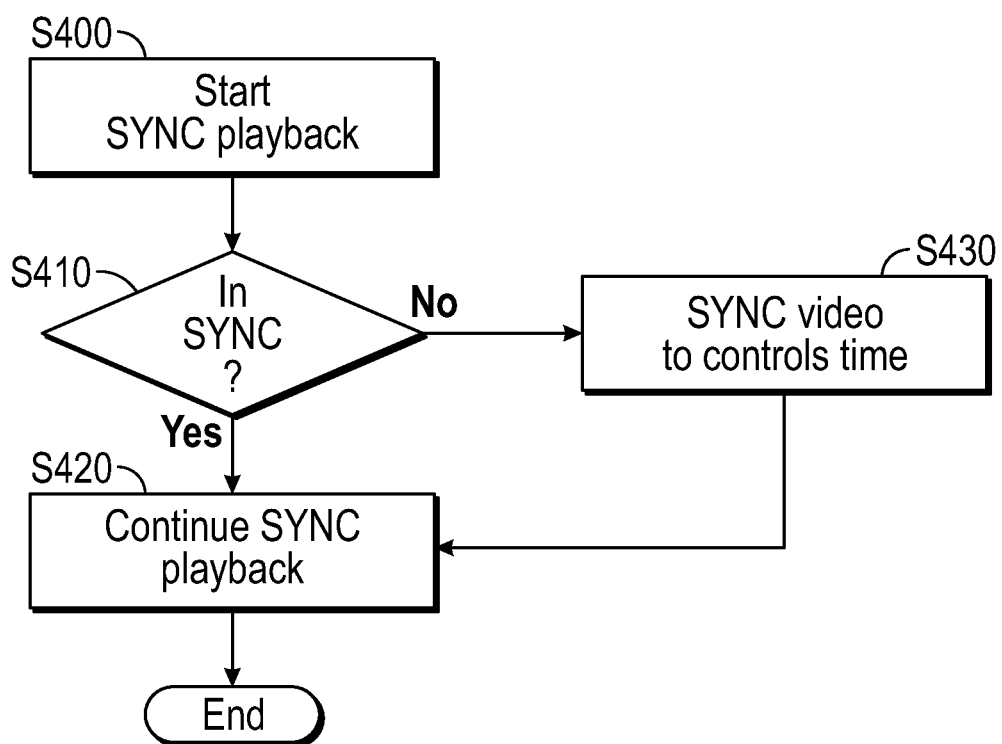
FIG. 8C is a flowchart illustrating steps for determining whether videos played during sync playback are in sync with their timelines in accordance with an embodiment of the present disclosure.

Referring now to the flowcharts of FIGS. 8A-8C, the various steps for sync playback are described depending on a user input via the UI. In particular, FIG. 8A is a flowchart of the steps that take place when the user selects the play button on the UI. Upon receiving a play instruction in step S100 in the UI, it is then determined if all video players are ready in step S110. All video players are ready if all the video players selected for sync playback have reported to the controller that they are ready (i.e. have enough data loaded into their source buffers to play). If all players are ready (Yes in step S110), the next step S120 proceeds with sync playback. Sync playback continues until there is an event that ends sync playback. Alternatively, if it is determined in step S110 that not all players are ready (No in step S110), then the next step is to determine if at least one video player is not ready in step S130. A video player may be determined not ready for a variety of reasons including if it is still loading data by way of example. If it is determined in step S130 that at least one of the video players is not ready (Yes in step S130), then all the video players are paused in step S140. After all the players are paused in step S140, the sequence data is monitored in step S150, then the process returns to step S110 to determine if all the players are ready. Monitoring the sequence data in step S150 enables determining whether the video player(s) that was not ready has changed status to ready to play. Returning now to step S130, if it is determined that there is not at least one player not ready (No in step S130), then it is determined in step S160 whether any of the video players have data gaps. If it is determined that none of the video players have data gaps (No in step S160), the process returns to step S110. Alternatively, if it is determined that at least one of the video players has a data gap (Yes in step S170), then sync playback is initiated with the video players that don't have data gaps, while the video player(s) with the data gap are paused. Subsequently, in step S150, the sequence data is monitored to determine if the video player(s) that were paused may be resumed.

Referring now to FIG. 8B, a flowchart indicating the various steps for sync playback upon received a user input other than a play instruction via the UI. The method is initiated by receiving a user input in step S200 via the UI. In step S210, it is determined whether the user input via the UI was a pause or seek instruction. If it is determined in step S210 that the user pressed the pause button, then in step S220 all the video players are paused. If pause is selected by the user, a return to sync playback may only occur via a user instruction to continue sync playback by pressing the play button for example. Alternatively, if it is determined in step S210 that a seek instruction was received, the next step is to determine whether there is data in the buffer in step S220. The seek instruction occurs when the user interacts with the skip to next sequence button, skip to previous sequence button, skip (10 s) button or moving the scrubber on the timeline. Upon obtaining the seek instruction from the user, it is determined whether there is sequence data in the source buffer. In step S220, if it is determined that there is no sequence data in the source buffer (No in step S220), then the step for loading data is initiated in step S240. Subsequently, in step S250 the source buffer is cleared and then in step S260 the source buffer is filled with the loaded sequence data. Next, in step S270, sync playback is initiated at the seek position. Alternatively, if it is determined in step S220 that data exists in the source buffer (Yes in step S220), then the process proceeds to step S280 to being the seek process to the user instructed position. Then, in step S290 it is determined if any of the players have data gaps. If there are no gaps in any of the players (No in step S290), then the process proceeds to step S270 for initiating sync playback at the seek position. Alternatively, if it is determined that at least one player has a data gap (Yes in step S290), then in step S300 sync playback is initiated for all the players except the player with the data gap. In step S310, a monitor sequence data is executed and the process returns to step S290 to reevaluate whether any data gaps exist in any of the players.

If the user seeks and the data is not in the buffer for any video, all video players will be paused and a loading icon shown. Once every video player reports to the controller that they are ready, the controller will start playback but only if the controls were in a "playing" state. For example, in a first scenario, the user started sync playback, video is playing. While the video is playing the user drags the scrubber and causes a seek. When the video players do not have the data, the video players fetch it over the network. When they have the data, the controller knows that the videos were playing before the seek and starts playing from the seek point. In a second scenario, the user paused sync playback so that nothing is playing. The user then seeks while in a paused state. The video players don't have the data and fetch it over the network, then the video players have the data and report to the controller that they are ready. However, the controller knows that the sync playback is in the paused state and will not continue sync playback. It is up to the user at that point to resume sync playback by the pressing the play button again. The method for sync playback according to the present disclosure distinguishes between controller (global) and video player "playing" states. The global "playing" state (which applies to Sync Playback as a whole): There is a global state variable "playing" (if true, all videos are playing; if false all videos are paused). The global "playing" is directly controlled by the user through "pause/play" buttons. Then each video player also maintains a "playing" state variable for itself. The distinction is made because of data gaps. If the user wants to start playback and out of the 4 selected videos, 3 have sequences (data to play) and 1 does not (no data/gap). The user presses play. Global playing is set to "true". The controller will instruct all video players to start playback. The three video players with data will play. The one video player with no data understands that the controller wants it to play but there is no data, so the video player will stay paused and keep its local playing variable set to false. As time elapses, the videos are still playing. In the meantime, the one video that had a gap now is back in a sequence. That video player knows that it has loaded the data. It now checks what the "global playing" variable looks like. If it is still set to "true" it will start playing as well. That is why there is a global and local playing state. Each video player is standalone and controls everything about its data. The controller has nothing to do with the fine details of what that data looks like. All the controller cares about is that all players play when they should and all players are paused when they should. Sync Playback is essentially a syncing/control layer over completely independent video players with the advantage of the sync playback custom wrapper for converting between timestamps and video offset values.

Referring now to FIG. 8C, the flowchart illustrates a processing loop that is continuously implemented during sync playback to ensure that all videos are in sync with the timeline. In step S400 sync playback starts. During sync playback, it is determined in step S410 whether the videos that are playing are in sync. In one embodiment, this determination occurs at one-second intervals, however the one-second intervals are an arbitrary amount and an in sync determination may be configured to determine whether the videos are in sync at periods that is less than or greater than one second. It should be noted that an interval that is less than one second may unnecessarily waste computing resources. The one-second threshold is a compromise between smooth playback and accuracy. If videos are out of sync with the timeline by less than one second then it is not really an issue because it is not noticeable by the user. In step S410, if it is determined that the videos are in sync (Yes in step S410), the sync playback continues according to step S420. Alternatively, if it is determined that the videos are not in sync (No in step S410), then the next step S430 includes syncing the video to the controls time and then resuming sync playback in step S420. This processing loop continues throughout sync playback until sync playback terminates based on a user instruction or a time out threshold being satisfied.

Figure 9A:
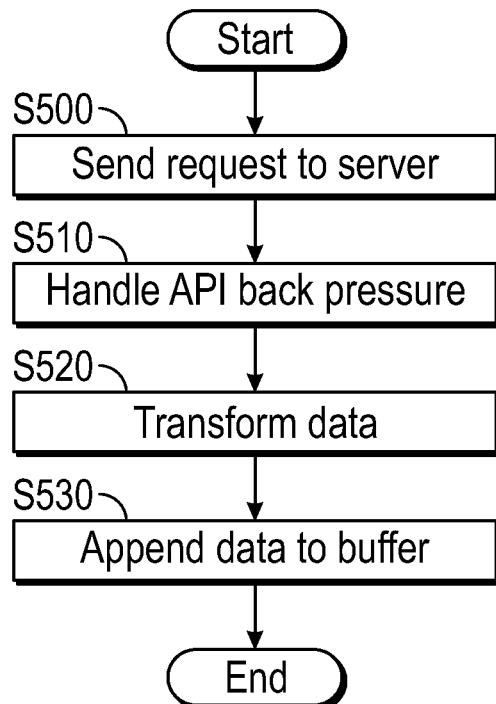
FIGS. 9A and 9B are flowcharts illustrating media source extension flow to enable sync playback in accordance with an embodiment of the present disclosure.

FIG. 9A is a flowchart illustrating steps of the media source extension. The media source extension are the steps taken by the stream service component. The stream service works with the media source extension API to add data to the source buffer. Initially, the video player upon receiving an instruction from a user to initiate sync playback via the UI, a request is sent to the server of the stream service in step S500. The request is a chunk/part of the sequence because not all the data of the sequence can be loaded at once unless the sequence is very small. So the sequences are divided into equal four second chunks and those are loaded. Subsequently the stream service handles API backpressure in step S510. The next step S520 involves transforming the data. Once the data is transformed, it is passed to to an overflow buffer, which handles the API backpressure. The overflow buffer then tries to append the data to the source buffer until all date is appended in step S530.

Figure 9B:
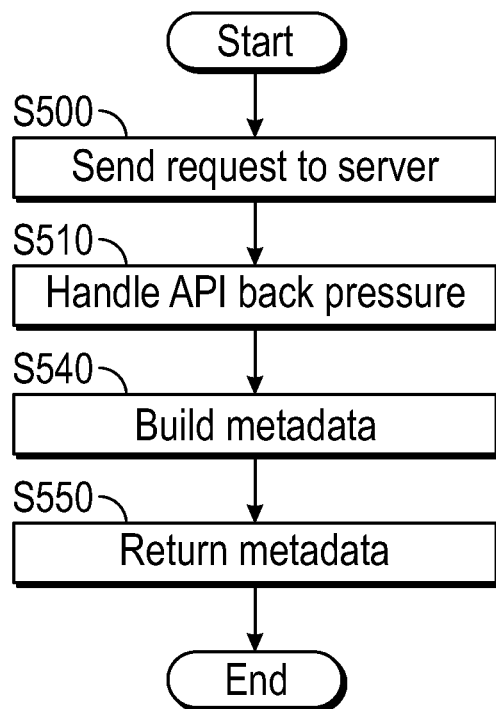

FIG. 9B is a flowchart illustrating the metadata building process. The first two steps are identical to the first two steps from FIG. 9A and is not repeated herein. Initially, the video player upon receiving an instruction from a user to initiate sync playback via the UI, a request is sent to the server of the stream service. Subsequently the stream service handles API backpressure. Then the stream service builds the source buffer metadata as shown in FIG. 4. Then the source buffer metadata is transmitted to the video player for sync playback. The source buffer metadata includes Unix timestamps to offset-based video times and other important metadata which allows the video player to determine what's inside the source buffer at any particular moment.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation to encompass all such modifications and equivalent structures and functions.

What is claimed is:

1. A method for initiating synchronized playback within a user interface, the method comprising:
   requesting a plurality of data;
   processing the plurality of data so that the plurality of data is compatible with the user interface, wherein portions of data from the plurality of data are stored in an overflow buffer while a source buffer processes the plurality of data;
   generating a metadata object to facilitate synchronized playback on the user interface by determining what data is in the source buffer of the user interface that needs to be removed and searching for data using a first time format that is not natively supported by the user interface and converting the first time format into a second time format that is natively supported by the user interface;
   synchronizing between a plurality of videos using a controller from the generated metadata object,
   wherein each video from the plurality of videos is represented as a sequence in the source buffer of the user interface.

2. The method according to claim 1, wherein the user interface is a web browser.

3. The method according to claim 1, wherein the plurality of data is processed by generating requests, each request including a start timestamp and an end timestamp.

4. The method according to claim 3, wherein each request represents a predetermined amount of video time.

5. The method of claim 1, wherein a video player is used to retrieve the metadata object and manages removal of the data from the source buffer of the user interface.

6. The method of claim 1, wherein the controller stores current timestamps and a video playing state.

7. The method of claim 6, wherein the current timestamps are provided by a custom wrapper associated with a clock, the clock also providing video offset values that enables converting the current timestamps to a video offset value by the metadata object.

8. The method of claim 1, wherein each video from the plurality of videos are controlled by a video player and is in communication with the controller.

9. The method of claim 1, wherein the first time format is timestamp and the second time format is a video offset value.

10. The method of claim 1, wherein the user interface includes an edit button for adding or removing a video to be included in synchronized playback on a display.

11. The method of claim 1, wherein the user interface displays at least two videos for synchronized playback, each video corresponding to a separate video player that is in communication with the controller.

12. The method of claim 1, wherein the user interface includes a first and a second timeline for each video that is displayed for synchronized playback, the first timeline representing available video data to be viewed and the second timeline representing a recorded motion event.

13. The method of claim 1, wherein each video displayed on the user interface for synchronized playback corresponds to a network surveillance camera.

14. A client apparatus for initiating synchronized playback within a user interface, the client apparatus comprising:
a memory that stores a program; and
at least one processor that executes the program stored in the memory to perform:
requesting a plurality of data;
processing the plurality of data so that the plurality of data is compatible with the user interface, wherein portions of data from the plurality of data are stored in an overflow buffer while a source buffer processes the plurality of data;
generating a metadata object to facilitate sync playback on the user interface by determining what data is in the source buffer of the user interface that needs to be removed and searching for data using a first time format that is not natively supported by the user interface and converting the first time format into a second time format that is natively supported by the user interface;
synchronizing between a plurality of videos using a controller from the generated metadata object,
wherein each video from the plurality of videos is represented as a sequence in the source buffer of the user interface.

15. A non-transitory computer-readable storage medium storing a program that, when executed by a computer, causes the computer to perform a method for initiating synchronized playback within a user interface, the method comprising:
requesting a plurality of data;
processing the plurality of data so that the plurality of data is compatible with the user interface, wherein portions of data from the plurality of data are stored in an overflow buffer while a source buffer processes the plurality of data;
generating a metadata object to facilitate sync playback on the user interface by determining what data is in the source buffer of the user interface that needs to be removed and searching for data using a first time format that is not natively supported by the user interface and converting the first time format into a second time format that is natively supported by the user interface;
synchronizing between a plurality of videos using a controller from the generated metadata object,
wherein each video from the plurality of videos is represented as a sequence in the source buffer of the user interface.

* * * * *